(12) United States Patent
Kemppainen

(10) Patent No.: US 6,671,365 B2
(45) Date of Patent: Dec. 30, 2003

(54) METHOD AND ARRANGEMENT FOR CALL CONTROL USING A COMPUTER CONNECTED TO A NETWORK

(75) Inventor: Vesa Kemppainen, Helsinki (FI)

(73) Assignee: Tecnomen Oyj, Espoo (FI)

( * ) Notice: Subject to any disclaimer, the term of this patent is extended or adjusted under 35 U.S.C. 154(b) by 36 days.

(21) Appl. No.: 09/943,581

(22) Filed: Aug. 30, 2001

(65) Prior Publication Data

US 2002/0021794 A1 Feb. 21, 2002

Related U.S. Application Data

(63) Continuation of application No. PCT/FI00/00158, filed on Mar. 1, 2000.

(30) Foreign Application Priority Data

Mar. 1, 1999 (FI) .................................................. 990429

(51) Int. Cl.[7] .............................................. H04M 7/00
(52) U.S. Cl. .................................... 379/220.01; 379/352
(58) Field of Search ............................ 379/201.01, 219, 379/220.01, 229, 230; 370/352, 353, 354

(56) References Cited

U.S. PATENT DOCUMENTS

| 5,598,464 | A | | 1/1997 | Hess et al. .................. 379/213 |
| 6,237,093 | B1 | * | 5/2001 | Vatanen |
| 6,408,063 | B1 | * | 6/2002 | Slotte et al. |

FOREIGN PATENT DOCUMENTS

| WO | 97/22209 | 6/1997 | ............ H04Q/3/00 |
| WO | 97/23988 | 7/1997 | ............ H04M/3/42 |
| WO | 98/18283 | 4/1998 | ........... H04Q/11/00 |

* cited by examiner

Primary Examiner—Creighton Smith
(74) Attorney, Agent, or Firm—Darby & Darby

(57) ABSTRACT

For controlling a call in a telecommunication system, a call is established from a terminal to a first server, where said call is associated with a network browser. Said network browser is used to locate and download a stored file and the contents of the downloaded stored file are interpreted. The interpreted contents of the downloaded stored file are used to control said call.

9 Claims, 4 Drawing Sheets

METHOD AND ARRANGEMENT FOR CALL CONTROL USING A COMPUTER CONNECTED TO A NETWORK

This is a continuation of application Ser. No. PCT/FI00/00158, filed Mar. 1, 2000.

The invention concerns generally the methods and arrangements for controlling the proceeding of a telephone call. Especially the invention concerns the use of a network-connected computer for such controlling.

For the purposes of this patent application, the concept of a telephone call (or "call" for short) is generally understood to refer to any telecommunication connection for transferring voice, data and/or other types of information between a limited number of selected participants that take part in the call through any terminals connected to any networks. Examples of such telephone calls are mobile telephone calls, novel packet-switched connections such as GPRS connections (General Packet Radio Service), calls made from a conventional wireline telephone and so-called Internet calls. The networks are telecommunications systems for offering a very large number of potential connections between arbitrarily selected participants, and they especially include circuit switched telephone networks (both wireline and mobile) and packet switched networks used at least partially for making calls. A participant in a call can be a human using a terminal, or a computer. A call can convey any types of data especially including voice and video streams. A terminal can be any device connected to a network, especially a wireline telephone, a mobile telephone or a computer having access to a network between computers. Call control is especially understood as a process involving the control of switches used for relaying calls. A switch can be either a conventional switch for circuit switched telephone network, or a counterpart of a switch in a packet switched network (like an IP or Internet Protocol network), e.g. a "Gatekeeper" according to the standard H.323 of ITU-T (International Telecommunication Union—Telecommunication Standardization Sector). Call control as a generic term also applies to a call routed directly between terminals without a switch in between.

As an example of a prior art solution for call control we will briefly describe a known solution for call diverting and voice mail. FIG. 1 illustrates a simplified telecommunication system where a circuit switched telephone network 100 comprises a switch 101. A first user terminal 102 and a second user terminal 103 are coupled to said switch; the connections may comprise a large number of intermediate segments and devices like private branch exchanges and routers (not shown). The switch is equipped with a voice mail service unit 104 with memory means for storing and playing back information sequences that represent voice messages.

At the first instant the user of the first terminal 102 uses his terminal to record an answering message 105 into the voice mail system and gives the switch a command 106 to activate a conditional call diverting function that diverts an incoming call into the voice mail system if the user of the first terminal does not answer within a predetermined tine. At the second instant the user of the second terminal 103 tries to make a call to the user of the first terminal, causing a connection request message 107 to be transmitted to the switch 101 and further to the first terminal. The user of the first terminal does not answer, so at the third instant the call is diverted to the voice mail system 104 which plays back to the caller the previously recorded answering message according to arrow 108. At the fourth instant the caller stores a voice message 109 into the voice mail system and ends the call. At later time instants that are not shown in FIG. 1 the user of the first terminal may contact the voice mail system and listen to the stored messages left by other users.

In the system of FIG. 1 the call control functions are all realised within the switch 101, which requires that the telephone operator that is responsible for the operation of the switch must have implemented the corresponding functional blocks as parts of the switching equipment. The same is true for many other known call control functions, although some modem terminals like digital mobile telephones also comprise features that may be used to implement some limited call controlling. In any case the known solutions for call control are not very flexible in the sense that they offer very limited possibilities for personalizing the call control functions according to the needs of individual users.

It is therefore an object of the present invention to provide a method and an arrangement for implementing call control functions in a highly personalized manner. It is an additional object of the invention to provide a method and an arrangement for offering good extensibility and scalability as well as backwards-compatible updating possibilities for the implementation of call control functions. It is a still further object of the invention to provide a call control solution that would not require extensive updating to the existing hardware of information transfer systems.

The objects of the invention are achieved by letting the information content of a stored file in a network-connected server to implement call control.

The method according to the invention is characterised in that it comprises the steps of
a) establishing a call from a terminal to a first server,
b) associating said call with a network browser in said first server,
c) using said network browser to locate and download a stored file,
d) interpreting the contents of the downloaded stored file and
e) using the interpreted contents of the downloaded stored file to control said call.

The invention also applies to a computer device comprising
means for establishing connections with the terminals of a first telecommunication network and
network browser means for locating and downloading stored files from the servers of a second telecommunication network; it is characterised in that it additionally comprises
means for associating established connections with the terminals of said first telecommunication network with certain network browser means for locating and downloading stored files and
means for controlling the established connections with the terminals of said first telecommunication network according to the contents of the downloaded stored files.

Additionally the invention applies to a telecommunication system that is characterised in that it comprises
a first server,
a first telecommunication network for establishing connections between the terminals of said first telecommunication network and said first server,
a second telecommunication network for establishing connections between said first server and other servers,
means for downloading stored files from said other servers to said first server and
means for controlling the established connections between the terminals of said first telecommunication network and said first server according to the contents of the stored files downloaded from said other servers to said first server.

A web page is a file of electronically stored information that it available for a computer connected to a network and suited to transferring from said computer through said network to other computers. The most common example of a web page is a file written in HTML (HyperText Mark-up Language) and stored within a computer that is coupled to the Internet. The user of another computer may access the web page by using a program called as a network browser to download a copy of the corresponding file and an HTML parser to convert the HTML sequence into a graphical representation of the contents of the file.

HTML allows for certain subblocks of the web page file to be enclosed within certain start and end indicators called tags. An HTML parser that does not recognize a certain pair of tags ignores the information between them but handles all other, recognized information in the file correctly. This feature guarantees certain backward compatibility between web pages and HTML parsers: an old parser is still able to read and handle a part of a web page containing novel subblocks if the web page is otherwise written in terms that were known at the time of producing the parser.

According to the invention a network browser and a parser (usually contained within the network browser) are associated with a call that is directed to a certain web page. The page is allowed to contain call control functions that are enclosed within certain tags. When the parser recognizes a tag corresponding to call control functions, it causes these functions to be performed on the associated call. The call control functions that are possible to realize this way comprise but are not limited to call divert call forwarding, pre- and post-call announcement, mid-call announcement, call hang-up, call set-up and conference call, call screening and delivery lists. These basic capabilities can be used for building services like for example audio and video call completion, interactive voice response, video on demand, conference call, video conference, voice mail, unified messaging, voice activated dialling, personal number service, virtual private networks and called party pays.

In addition to web pages in the narrow meaning, also other kind of stored files may be used to implement the above-explained features. Network browsers may be used to locate and download files for example from the so-called ftp (file tranfer protocol) and telnet servers.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
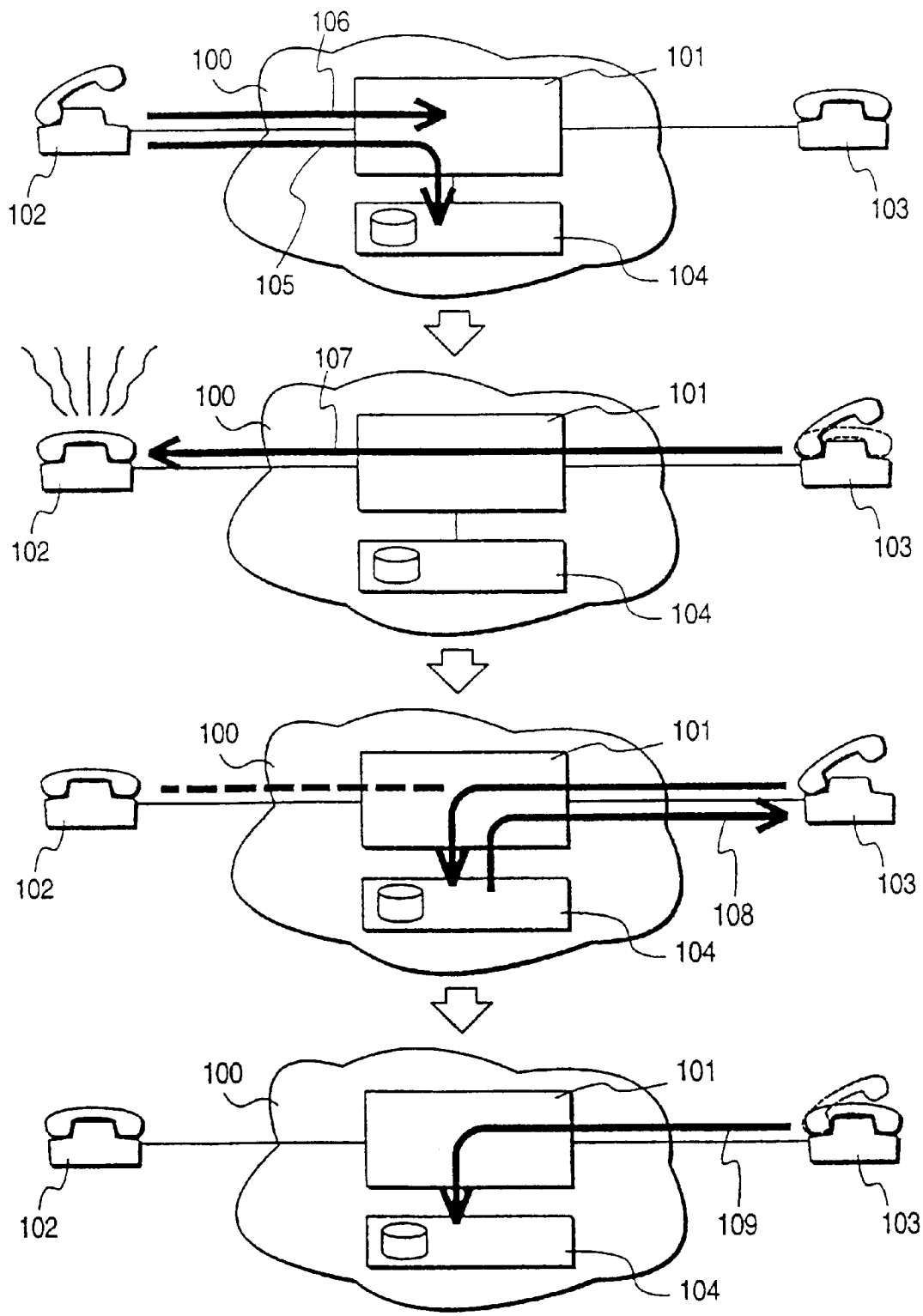
FIG. 1 illustrates a known solution for call control.

FIG. 1 was discussed in the description of prior art, so the following description will focus mainly on FIGS. 2 to 6.

Figure 2:
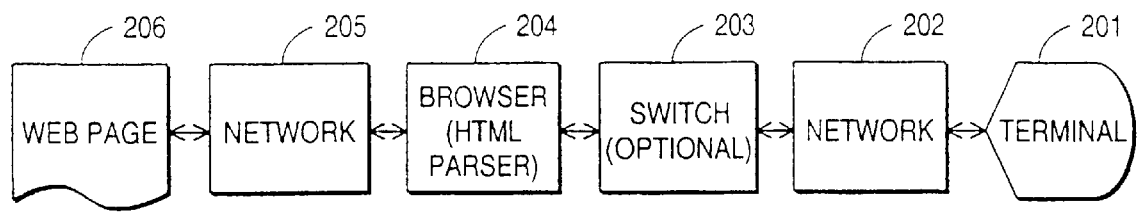
FIG. 2 illustrates the functional components of an embodiment of the invention.

FIG. 2 illustrates a series of functional components that take part in the control of a call according to an advantageous embodiment of the invention. The functional components do not necessarily correspond to physical devices. Terminal 201 is a terminal of a network for making and receiving telephone calls and network 202 corresponds to said network. The calls originating within said network are usually routed through a switch 203, which is however not an essential functional component from the point of view of the invention. At block 204 the call originating from terminal 201 is associated with a network browser for making a connection, through network 205 (which may be the same network as network 202), to a web page 206. The browsers has access to a corresponding parser (not separately shown) for interpreting the contents of downloaded web pages and locating possible call control functions.

Figure 3:
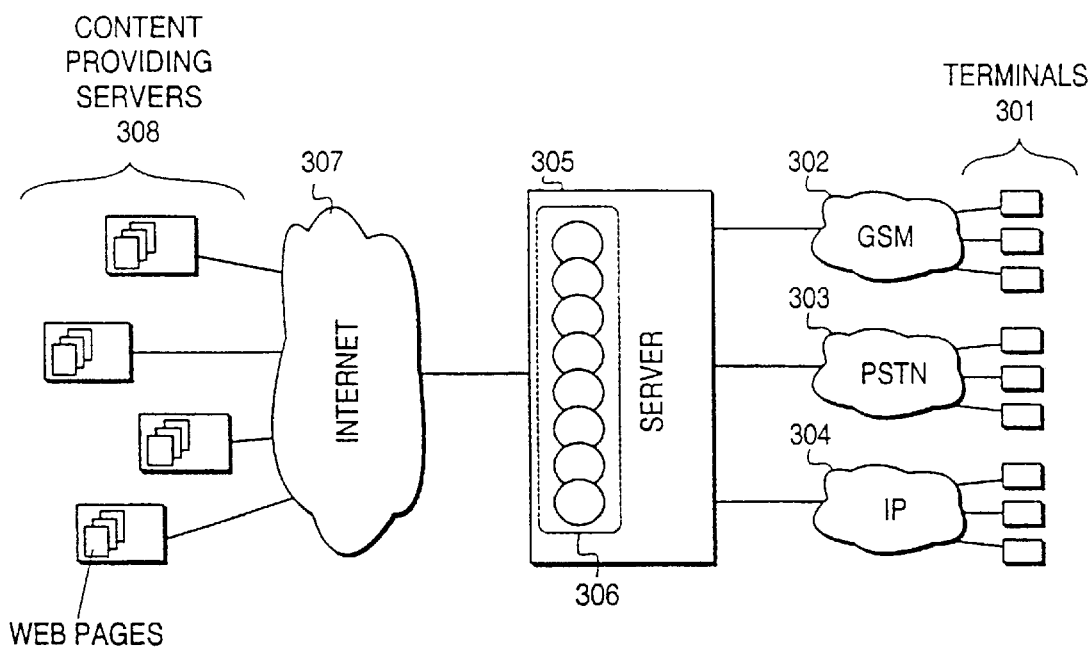
FIG. 3 illustrates a system framework for application of the invention.

FIG. 3 illustrates a more specified system framework where the present invention is applicable. At the far right in FIG. 3 a number of terminals 301 are coupled to their respective telecommunication networks, of which a cellular radio network 302 (GSM—Global System for Mobile telecommunications), a public switched telephone network 303 (PSTN) and a packet-switched IP network 304 are shown. The selection of telecommunication networks is naturally exemplary and a number of other telecommunication networks could be presented as well. From each telecommunication network there is a connection to a server 305 for running simultaneously a large number of network browsers 306. These network browsers may otherwise resemble the known network browsers of the date of filing this patent application, but they need not to comprise a graphical user interface for displaying downloaded web pages. On the other hand there must be a linking functionality that makes the necessary interpretations between the call control protocols of the various telecommunication networks and the information format used by the network browsers. The server 305 is coupled to an unlimited number of other computers called content providing servers 308 through the Internet 307. Each content providing server provides a number of web pages for users having access to the Internet. Also server 305 may be a content providing server.

Figure 4A:
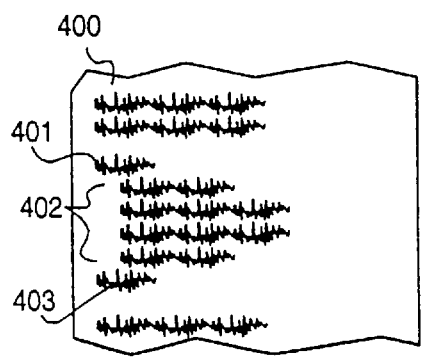
FIG. 4a illustrates a web page according to a first embodiment of the invention.

FIG. 4a illustrates schematically a part of the contents of a web page 400 that might reside in one of the content providing servers 307 of FIG. 3. At point 401 there is a start tag that indicates the beginning of a section 402 containing call control functions. Said section ends at an end tag 403. The advantage of using a pair of tags to indicate the limits of the call control section is that the same web page is understandable to network browsers that are not familiar wit the call control functions: they will simply ignore the interval between points 401 and 403. Similarly, if there are older and newer versions of those network browsers around that should be able to recognize the call control functions, a plurality of tag pairs may be used: specific tags mark off those call control sections that are only comprehensible to browser versions that are not older than a certain oldest possible version.

The command set which is used within section 402 to describe the desired call control functions must be chosen so that it will be possible to convey the respective instructions to the switch or other functional entity that will perform the actual control operations to the call. Three suitable command sets have been defined in the TAPI (Telephony Application Programmers Interface), TSAPI (Telephone Services Application Programming Interface) and CSTA (Services for Computer Supported Telecommunications Applications Phase III) specifications which are known to the person skilled in the art, but the invention allows for other command sets to be applicable as well. One feasible alternative is that the command set is associated with the network browsers that are used to access the web pages, and the network browsers comprise a specific command interpretation unit for translating the browser-specific commands to those belonging to some more widely used command sets like the ones named above.

Section 402 may also comprise so-called event handlers which are conditional commands to be executed only at the occurrence of a certain triggering event like the arrival of an incoming call or the detection of hang-up, busy, not answered or other condition. An advantageous form of an event handler is a pair of fields where the contents of the first field identify the triggering event that should trigger the execution of the command and the contents of the second field identify an URL or Universal Resource Locator that indicates where the browser should be redirected to at the occurrence of the triggering event.

Figure 4B:
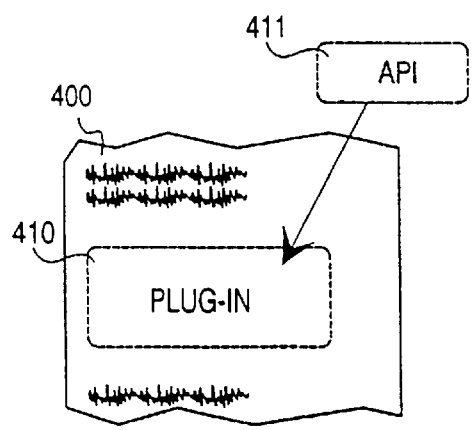
FIG. 4b illustrates a web page according to a second embodiment of the invention.

FIG. 4b illustrates schematically an alternative embodiment for embedding a set of call control commands to a web page. At a certain location 410 of the web page a so-called plug-in component is added, and the author of the web page is provided with a certain Application Programming Interface 411 or API for editing the contents of the plug-in. A network browser that comes across a plug-in component within a web page will download it together with the rest of the web page and use a specific interpretation unit if necessary to interprete the contents of the plug-in component. Conceptually such interpretation corresponds to an HTML parser interpreting an HTML passage between a pair of tags.

In a system where some call control commands to a telecommunication switch come from a distant web page somewhere in the Internet, it will be in the interests of the operator responsible for the operation of the switch to carefully supervise who is commanding the switch to do what. From the technology of secure communications over the Internet there is known a variety of required secure communication features such as authenticity (a packet was actually sent by the node it claims to have been sent by), integrity (the packet was not modified in transit), non-repudiation (the sending node cannot deny having sent the packet) and privacy (no third party can read the contents of the packet). A protocol known as the IP security protocol (IPSEC) is being standardized by the IETF (Internet Engineering Task Force) for accomplishing these goals. As an advantageous feature of the invention the IPSEC protocol or other corresponding security arrangements are employed between the server running the network browsers and the content providing servers.

The operator responsible for the operation of the switch may even allow for individual web page authors or suitably defined web page author groups to employ some limited sets of call control commands, and/or require that the web pages are presented for inspection and approval before they may be used to control calls. Similarly the callers may be divided to different caller categories according to which call control functions are available. To implement the limitations there must be a database associated with the switch and/or the server running the network browsers: the currently valid caller and service provider groupings are stored in the database and when a connection from a call to a web page is established, suitable screening functions are set up to prevent the use of non-allowed call control functions. A further aspect of the restrictions is the possibility of a caller to set some predefined limits to what kind of call control functions may be used to control his call. Usually a connection request transmitted by the caller's terminal contains some signalling fields so a predefined signalling field could be used to indicate the limits to applicable call control functions. When a connection from the call to a web page is established, the screening functions can also be based on these signalled limits.

Figure 5:
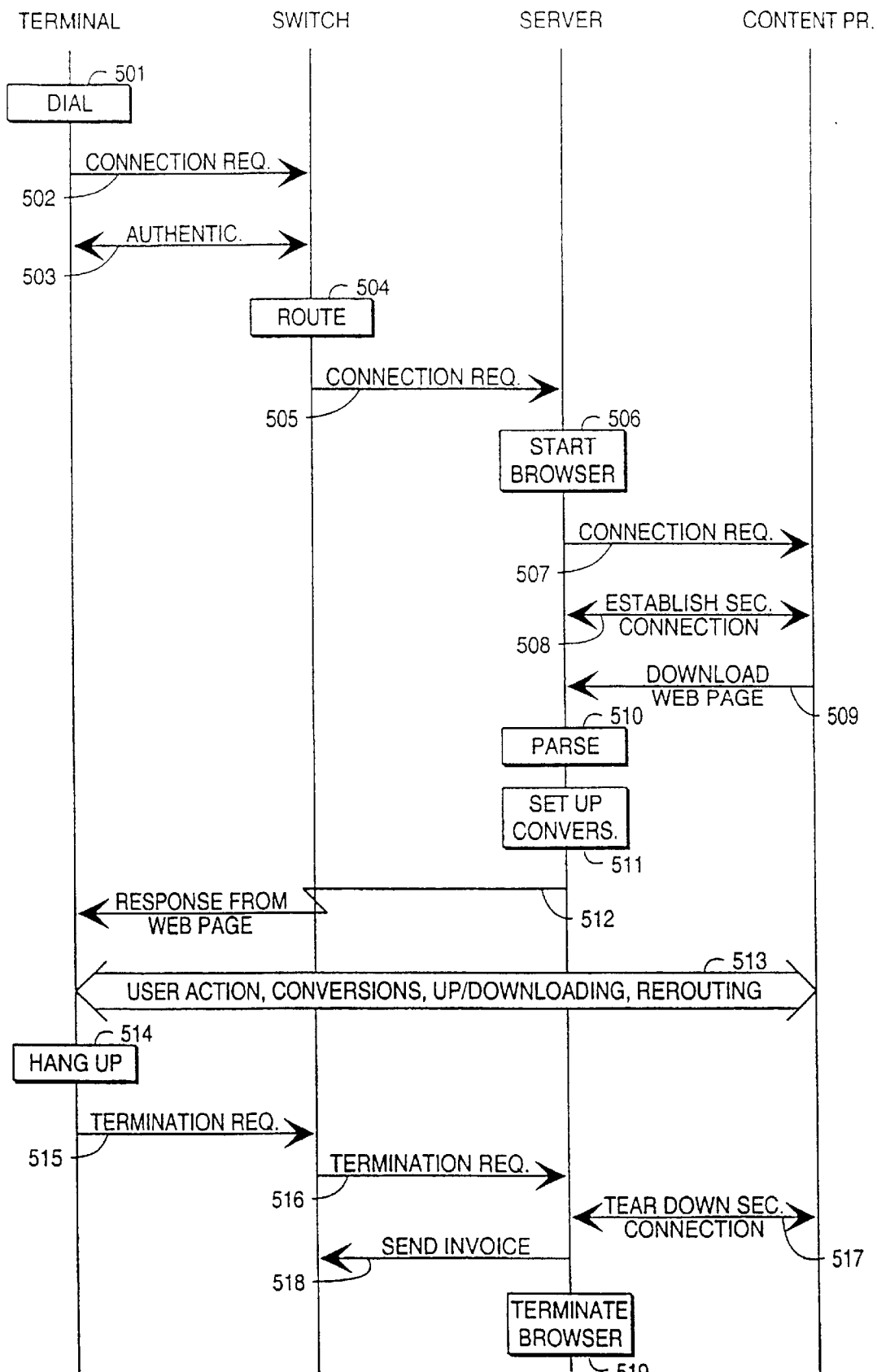
FIG. 5 illustrates a method according to an advantageous embodiment of the invention and FIG. 6 illustrates a computer device according to an advantageous embodiment of the invention.

Next we will describe an advantageous embodiment of the method according to the invention with reference to FIG. 5, where the represented functional entities are the terminal, a switch, a browser-running server and a content providing server. For the sake of example we will assume that the terminal is a mobile telephone of the third generation (e.g. an UMTS phone—Universal Mobile Telecommunication System) and the service which the user wants to use and which is provided as a combination of call control functions on a web page is the purchase of tickets to a multiscreen film theater.

The operation begins at step 501 when the user of the terminal enters the identification of a ticket sales office, which ultimately refers to a certain web page at a certain content providing server. The user need not know about the nature of the actual recipient: the identification may be an ordinary telephone number. Naturally it may also have some other form and it may even be the actual network address of the intended web page. The terminal makes a connection request 502 to a mobile switching centre and an authentication 503 is performed to ensure that the caller is a legitimate and properly identified user of the mobile telecommunication system. Such authentication procedures are well known from the technology of present day mobile telecommunication systems. After the authentication step the switch routes the connection request towards the desired receiving party of the call; the routing decision is schematically shown as block 504. According to an advantageous embodiment of the invention the switch may remain completely unaware of the fact that the call will involve a connection to a web page. The switch will then handle the routing step exactly as it would do in routing a normal telephone call originating from a mobile terminal.

As a result of the routing there will be a connection request 505 from the switch to the server which is to run the network browsers. This connection request will contain at least the identification entered by the user at step 501, and advantageously it will also contain information describing the identity of the user, the communication capabilities of his terminal and so on. The server recognizes that the incoming connection request necessitates a network browser, so it starts one at step 506 or allocates an already running browser process. If the identification of the intended recipient is at this stage still in some other form than a network address, the server makes a corresponding conversion so that once the browser starts looking for the intended recipient from the Internet, it will look for a certain web page. For enabling such conversions it is easy to generate a look-up table in the server so that once the local telephone company (or other institution responsible for the operation of a network from which connection requests may originate) has allocated a telephone number to a certain service, the provider of said service will announce the telephone number and corresponding network address to the server. Looking for a certain network address takes place according to known methods and results in a connection request 507 to the corresponding content providing server.

We will assume that IPSEC or a similar arrangement is used for establishing a secure communication connection over the Internet at step 508. After that the requested web page will be downloaded from the content providing server at step 509. The browser will use its associated parser to interprete the contents of the downloaded web page at step 510.

The elements of a web page that are meant to be delivered to a user may contain text, static visual elements like still images, replayable parts like sound sequences and video clips, or even dynamically inserted stream-like objects like online video. Above we assumed that the terminal is a third generation mobile telephone and we may here further assume that it is capable of reproducing sound, text, graphics and moving images. Additionally we will assume that the connection requests to the switch and further to the server have contained an indication about the terminal's capabilities. At step 511 the server will set up the necessary conversions between the channels of the telephone connection between the terminal and the server on one hand and the interpreted contents of the downloaded web page. For example,

- displayable character strings read from the downloaded web page will be coupled to a downlink text channel of the telephone connection to be displayed on a display in the terminal,
- input character strings transmitted from the terminal in an uplink text channel will be coupled to corresponding character input fields of the web page,
- sound files and/or streams read from the web page or its plug-ins will be converted into the format which is used in the mobile telephone network to represent sound, and coupled to the downlink voice channel(s) of the telephone connection,
- inverse conversions will be applied to any voice messages or other sound sequences that arrive from the terminal on uplink voice channel(s); voice messages may e.g. be converted to a suitable packet format so that they may be forwarded into a suitable network voice message service the URL of which has been read from the web page,
- similar conversions will be applied to convert video clips or streams between their Internet format and mobile telephone network format; downlink and uplink video channels of the telephone connection will be employed.

The above-given conversions are naturally just examples of what the server may do. An optimal arrangement is such where all information content of the web page may be somehow conveyed to the user and also all potential responses from the user can be mapped into a format in which they may either be used as inputs to some input fields on the web page or transmitted to some other network locations identified on a downloaded web page. To this end it is advantageous that the server has good knowledge about the capabilities of the terminal and even about the allocated transmission capability between the terminal and the server. It is indeed a major function of the server to find out and implement suitable conversions between data formats: such conversions are widely describe in the telecommunications literature and straightforward as such to implement once the formats themselves are known.

After setting up the conversions the server is ready to transmit to the terminal the first response of the web page at step 512. Remembering our movie ticket sales example we may assume that the first response is a list of currently shown films. After that in FIG. 5 there is a general step 513 representing an arbitrary number of operations, of which the following are typical examples:

- simple user input, e.g. selection: we may assume that the user indicates the films of which he wants to see a "trailer" or a demonstration clip; such selection would be transmitted to the server,
- further downloadings from an arbitrary number of network locations: once the user has selected a few trailers the server will download the corresponding video clip files and transmit them (after suitable conversions) to the terminal on the video and/or audio channels of the telephone connection,
- uploadings: the user may leave a voice message into a customer feedback voice mail box,
- setting up further conversions: further downloadings may necessitate such conversions that were not previously set up,
- rerouting: the connection from the server to different content providers may be rerouted an abitrary number of times
- questions and answers: the user may request ticket prices and get an answer, or the web page may ask for preferences in selecting the seats,
- confirmed and/or secure transactions: the user may order a certain number of tickets to a certain show of a certain film, whereby the content provider will enter the reservations into the ticket sales system and confirm a successful order to the user; the content provider may even transmit the ordered tickets in electrical form to the user so that they will be stored into a smart card which the user will present for reading at the theatre entrance.

From the viewpoint of the user the process ends when he hangs up at stage 514. A corresponding connection termination request 515 will be transmitted to the switch and further 516 to the server. The secure communication connection between the server and the content providing server will probably require a controlled tear-down procedure 517 which may incorporate the exchange of final messages like an invoice for the purchased tickets. At step 518 the server transmits the invoicing information further to the switch so that it will eventually be charged from the user within his telephone bill (another way of arranging for the invoicing is to use the confirmed and/or secure transactions feature described above to transfer electronic money from the terminal to the switch, the server and/or the content providing server). Finally the procedure ends at the network browser being terminated or reallocated to a different connection at step 519.

Previously we have indicated that the switch is not an essential part in the operation of the invention. This is especially true if the terminal is not a telephone, because telephony systems traditionally rely heavily on switches. The terminal may be for example a computer and the connection between it and the server may take place for example through an IP network, whereby a separate switch is not needed. A natural consequence of leaving out the switch is that the functions of the switch that were described above must be performed by some other device which is typically the server.

Above we have already hinted at a major application field of the invention: the services that involve call control may be provided by so-called service providers instead of the operators that are responsible for the actual operation of telecommunication systems. Typically the content providing server is operated by somebody who wants to sell his services electronically over various kinds of networks, and the role of the telecommunication operator is only to set up the connections between terminals and servers, and possibly to operate the server that runs the network browsers and to acknowledge the web pages that are to perform call control.

Figure 6:
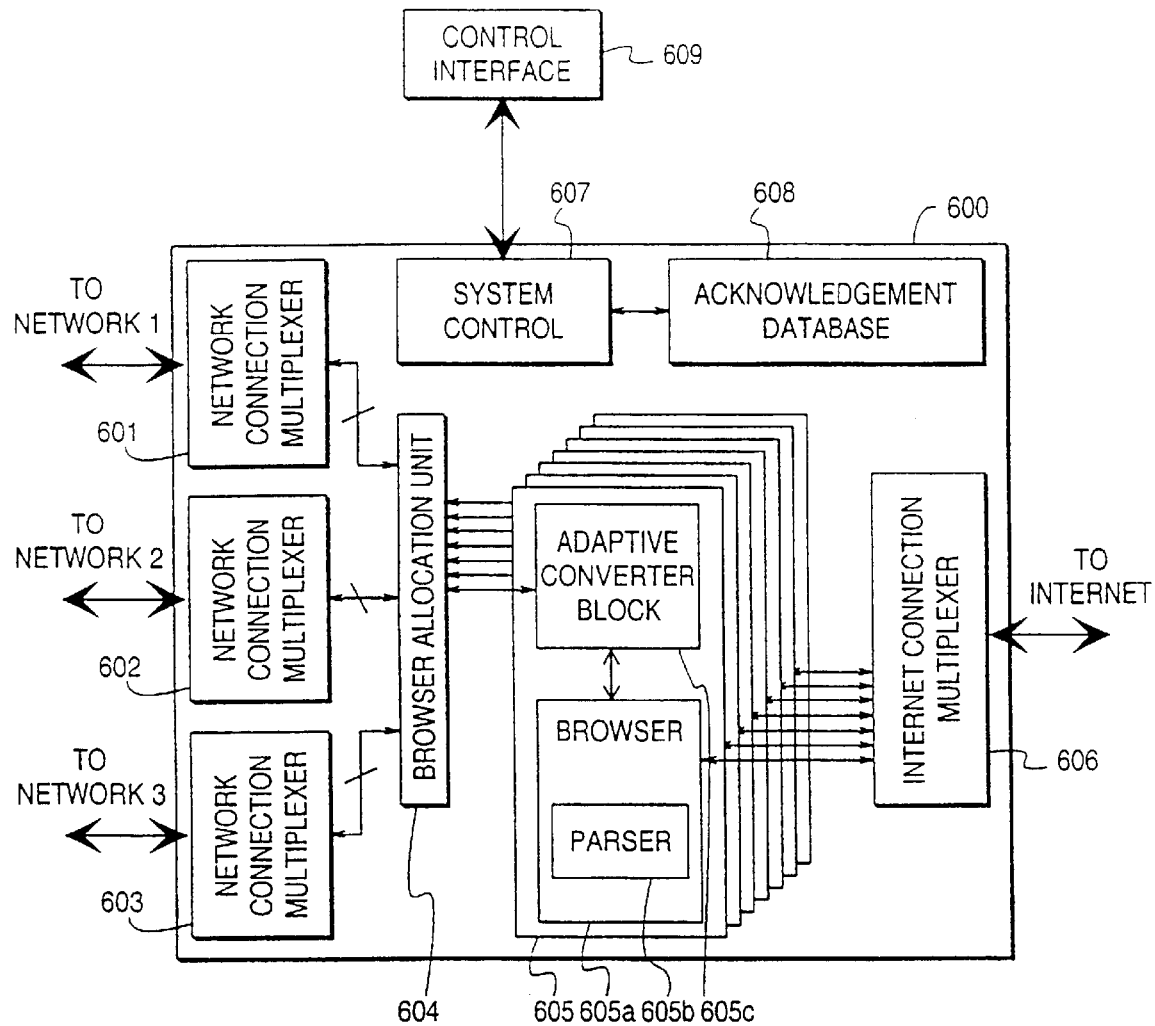

We will conclude by briefly describing the parts of the server that is user to run the network browsers with reference to FIG. 6. The server or generally the computer device 600 comprises a number of network connection multiplexers 601, 602 and 603 for connecting to various networks such as mobile and wireline telephone networks and packet-switched data networks. Each of them is capable of handing a large number of simultaneous calls. A browser allocation unit 604 is provided for allocating browser units 605 to incoming connection requests. Each browser unit comprises the browser proper 605*a* with its associated parser 605*b* as well as an adaptive converter block 605*c* for making the necessary conversions between data formats. Each browser has access to an Internet connection multiplexer 606 for locating web pages and exchanging information with the content providing servers where the web pages reside. A system control block 607 supervises the operation of the other blocks; for graphical clarity the contro connections between block 607 and the other blocks are not shown. One of the tasks of the system control block is to maintain the acknowledgement database 608 which contains the previously mentioned rules according to which incoming connection requests and/or call controlling web pages are categorized. A control interface 609 is also provided for a human user to control the operation of the server. The control interface may be implemented locally or it may be somewhere else, e.g. at an installation generally known as a service control point.

The embodiments of the invention that are presented above are only exemplary and they do not limit the applicability of the invention. A variety of additions and obvious alterations to the invention are possible without parting from the scope of the claims. For example it is not required that the connections between the server running the network browsers and the content providing servers take place through the Internet; the connections may go for example through an intranet or virtual private network, or the servers may be even locally connected.

What is claimed:

1. A method for controlling a telephone call in a telecommunication system, comprising the steps of:
   a) establishing a telephone call from a terminal to a first server,
   b) associating said telephone call with a network browser in said first server,
   c) using said network browser to locate and download a stored file,
   d) interpreting the contents of the downloaded stored file, and
   e) using the interpreted contents of the downloaded stored file to control said telephone call.

2. The method according to claim 1, wherein step e) comprises, as a telephone call control stage, at least one of diverting said telephone call, forwarding said telephone call, providing a pre-announcement, a mid-announcement or post-telephone call announcement, hanging up said telephone call, setting up another telephone call, providing a conference telephone call, screening a telephone call, and establishing a delivery list.

3. The method according to claim 1, further comprising the steps of:
   employing a first data format between said terminal and said first server,
   employing a second data format between said first server and a second server providing said stored file, setting up a conversion between said first and second data formats and using said conversion to convert data between said fast and second data formats.

4. The method according to claim 1, step a) further comprises the step of authenticating the terminal.

5. The method according to claim 1, step c) further comprises the step of establishing a secure communication connection between said first server and a second server providing said stored file.

6. The computer device for establishing control of a telephone call in a telecommunication system, comprising:
   means for establishing connections with terminals of a first telecommunication network;
   means for establishing connections with servers of a second tele-communication network;
   network browser means for locating and downloading stored files from the servers of a second telecommunication network;
   means for associating established connections with the terminals of said first telecommunication network with certain network browser means for locating and downloading stored files; and
   means for controlling the established connections with the terminals of said first telecommunication network based on contents of the downloaded stored files.

7. A telecommunication system for establishing controlled telephone calls between terminals and other telecommunication devices, comprising:
   a first server,
   a first telecommunication network for establishing connections between the terminals of said first telecommunication network and said first server,
   a second telecommunication network for establishing connections between said first server and other servers,
   means for downloading stored files from said other servers to said first server; and
   means for controlling the established connections between the terminals of said first telecommunication network and said first server based on contents of the stored files downloaded from said other servers to said first server.

8. The telecommunication system according to claim 7, wherein a multiple different first telecommunication networks establishes connections between the terminals of each first telecommunication network and said first server.

9. The telecommunication system according to claim 7, wherein said first telecommunication network is one of a mobile telephone network, a wireline telephone network, a packet-switched data network, and said second telecommunication network is the Internet.

* * * * *